April 14, 1959
H. KLEMPERER
2,881,855
PRECIPITATOR FLASHOVER CONTROL THROUGH
CURRENT AND VOLTAGE RESPONSE
Filed May 4, 1953
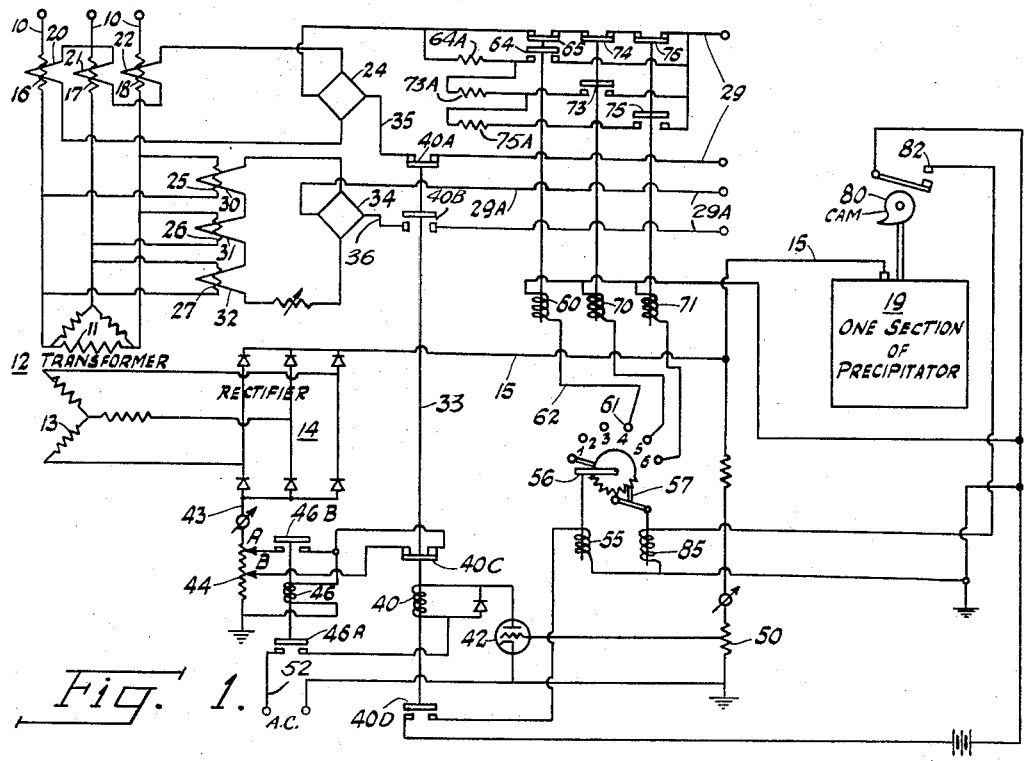
Fig. 1.
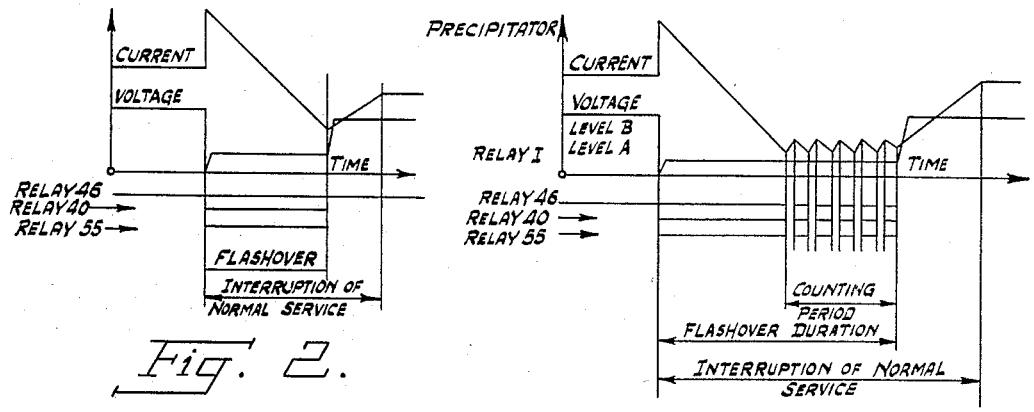
Fig. 2.
Fig. 3.
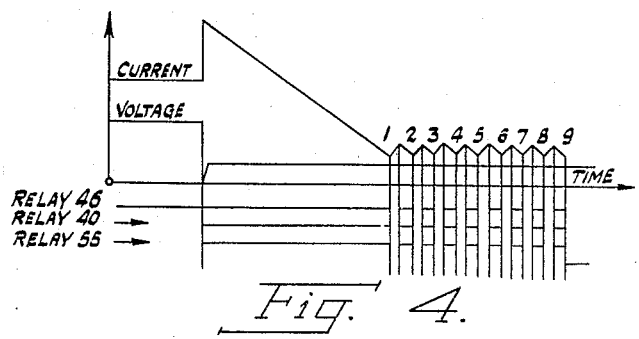
Fig. 4.
INVENTOR.
HANS KLEMPERER
BY
ATTORNEY

2,881,855

PRECIPITATOR FLASHOVER CONTROL THROUGH CURRENT AND VOLTAGE RESPONSE

Hans Klemperer, Belmont, Mass., assignor, by mesne assignments, to Apra Precipitator Corporation, New York, N.Y., a corporation of Delaware Application May 4, 1953, Serial No. 352,829

7 Claims. (Cl. 183—7)

The present invention relates to electrostatic precipitators and particularly to control means for extinguishing flashovers between the charged electrodes and the adjacent collecting surfaces.

In the operation of electrostatic precipitators it is desirable in order to obtain maximum efficiency to operate at voltages very close to the point at which flashovers are apt to occur. Flashovers are often due to the building up of particles on the electrodes and the collecting surfaces; when they occur the resulting arc may disappear by itself without deleterious effects or may continue for an undesirable period and cause damage to the precipitator or the power equipment through overloading the latter.

The present invention contemplates the provision of a control circuit in conjunction with the power circuit arranged so that when flashovers occur the resulting increase of current and decrease of voltage in the power circuit may be caused to automatically effect a reduction in the voltage applied to the electrodes so as to extinguish the flashover arcs.

The invention will be best understood upon consideration of the following detailed description of an illustrative embodiment thereof when read in conjunction with the accompanying drawing in which:

Figure 1 is a diagrammatic representation of the power circuit for charging the precipitator electrodes and the control circuit for dealing with flashovers when they occur, the electrostatic precipitator being diagrammatically illustrated.

Figures 2, 3 and 4 are graphs iluustrating current voltage relations during (1) short, (2) sustained and (3) prolonged flashovers, respectively.

In Figure 1 of the drawing the numeral 10 designates a three-wire alternating electrical current source to which the primary winding 11 of the power transformer 12 is connected. The secondary 13 of the transformer is connected to a rectifier 14 which converts the alternating current to direct current and through the wire 15 supplies a high voltage charging potential to the electrodes of the electrostatic precipitator diagrammatically represented at 19. Connected in series with the primary windings 11 of the power transformer 12 are three reactors 16, 17, 18, whose exciting windings 20, 21, 22 are energized from a separate source 29 of current through a rectifier 24. The primary windings 11 of power transformer 12 also have connected in parallel therewith three other reactors 25, 26, 27 whose energizing windings 30, 31, 32 are also separately energized from another source 29A through a rectifier 34.

The wires 35, 36 of the separate power circuits to the rectifiers 24 and 34, respectively, have therein normally closed contacts 40A and normally open contacts 40B, respectively. A solenoid coil or relay 40 is provided so that when the relay is energized contacts 40A open and contacts 40B close thereby deenergizing the control windings 20, 21, 22 of the series reactors 16, 17, 18 and energizing the control windings 30, 31, 32 of the parallel reactors 25, 26, 27 so that the reactance of windings 16, 17, 18 is increased and the reactance of windings 25, 26, 27 is decreased. The result is a reduction in the charging voltage supplied to the precipitator electrodes by the rectifier 14. The relay 40 is energized when contacts 46A are closed and if simultaneously electronic tube 42 in the control circuit is in a conductive state. The control circuit includes a wire 43 forming part of the current branch of the precipitator and containing a variable resistance or potentiometer 44 across which is connected the relay coil 46 for closing the contacts 46A when the current that flows through the wire 43 to ground is equal to a preset amount, for example to at least ten percent (10%) of the precipitator operating current.

The circuit for relay 46 includes the normally closed contacts 40A which are connected to a point intermediate the ends of potentiometer 44 and which normally remain closed while control relay 40 is deenergized to provide a connection for energizing the relay 46. The relay 46 itself has holding contacts 46B connected closer to the end of potentiometer 44 which contacts are normally open but which close on energization of relay 46 to reduce the current level through potentiometer 44 at which relay 46 stays closed.

The plate of the electronic tube 42 is connected to relay 40 which carries contacts 40A and 40B. In normal operation a negative charge applied to the grid of the electronic tube 42 prevents its firing and this bias is applied by connection of the grid to an intermediate point of a resistance 50 extending through additional resistances to the high voltage electrode charging wire 15 and being grounded at its other side. The current for electronic tube 42 and for energizing relay 40 are provided by a separate alternating current source 52.

When a flashover occurs the resulting overload of the power circuit causes an increased current to flow through wire 43 and potentiometer 44 connecting the rectifier to the ground. This current increase results in energization of the relay 46 through contacts 40C and closing of the contacts 46A. Although such a current increase may occur at other times, only during flashovers does it coincide with the reduction in the voltage applied as a bias to the grid of electronic tube 42, permitting the latter to fire. Consequently, when a current increase through the potentiometer 44 coincides with a predetermined reduction of the bias voltage applied to the grid of tube 42 the tube fires. Thus by simultaneous action of tube 42 and relay 46 the circuit for relay 40 is now complete and the latter is energized. This opens, 40C, the circuit for the rectifier 24 associated with the energizing windings of the rectors 16, 17, 18. At the same time the circuit for the rectifier 24 associated with the energizing windings of the parallel reactors 25, 26, 27 is closed at 40B. This results in the introduction of additional reactance into the primary circuit of the transformer 12 and a reduction in the charging voltage supplied to the electrodes of precipitator through the wire 15 from its power source.

The reduction of the precipitator voltage may immediately extinguish the flashover. This reduction of voltage in the power circuit is followed by a reduction of current flowing through the wire 43 of the control circuit and potentiometer 44 therein so that the current falls below the value required to maintain relay 40 energized at a level to hold the contacts 46A engaged. As the latter contacts open, the relay 40 is deenergized causing the position of contacts 40A and 40B to be reversed so that the series reactors again become energized with resultant increase in the voltage applied by the rectifier 14 to the precipitator electrodes. While the precipitator is being reenergized at the higher voltage and as a consequence of the extinguishing of the flashover arc negative voltage appears at the grid of the electronic tube 42 thereby preventing the latter from firing so that current does not pass through the relay 40 even though the relay 46 carrying contacts 46A might be reenergized, as for example, because of high load conditions. The control circuit therefore resets itself at a rate depending on the magnetic response of the reactors in the primary side of the power circuit.

During normal operation of the precipitator, relay 46 may be energized while relay 40 is held off by means of the tube 42 which is non-conductive as long as the voltage on the precipitator is higher than 10% for instance of the normal precipitator operating voltage. As a flashover occurs, the precipitator voltage breaks down, the bias on the tube 42 disappears, and relay 40 operates the saturable reactors 16, 17 and 18 and 25, 26 and 27, thereby reducing the flashover current. If the flashover disappears, the rising voltage across the precipitator will cause, by means of reappearing bias on tube 42, interruption of operation of relay 40 and normal voltage is soon restored as shown in Figure 2. It is for this reason of interruption that the tube 42, if gas filled, is operated from an A.C. supply 52. The duration of precipitator voltage reduction, therefore, is dependent on the duration of flashover and does not necessarily follow through a complete de-excitation cycle of the reactors.

If the flashover is sustained over a longer period (Figure 3), decreasing reactor excitation reduces the current level in the precipitator to level A, at which time relay 46 becomes deenergized. As contacts 46A open, relay 40 becomes deenergized and excitation of the series reactors increases. However, upon deenergization of relay 40 its contacts 40C close and as the precipitator current increases to the adjustable level B, relay 46 again becomes energized and in turn energizes relay 40, provided the flashover still hangs on and the tube 42 is without bias. This play of "counting" up to level B and back to level A will go on until either the flashover clears by itself as soon as an additional "too frequent flashover relay 55" has integrated the preset number of counts. If the flashover is in the nature of a short circuit, which case is shown in Figure 4, after a determined number of "counts," for example, nine as indicated, the precipitator power is interrupted by means of the too frequent flashover relay acting upon a primary circuit breaker.

The frequency of "counting" is adjustable by moving contacts A or B (Figure 1) relative to each other. During the counting period both relays 46 and 40 as well as the tube 42 go on and off together, the off-time of these three elements being defined by the re-energizing time constant of the reactor excitation. The counting levels A and B may be set for approximately 10% of the operating voltage. These levels could be set higher or lower if actual operation at gas velocity through the precipitator should show the tendency of flashovers to disappear automatically at higher or lower current levels.

The too frequent occurrence of flashovers in a short period of time is undesirable. The relay 40 is provided with an additional set of contacts 40D which close when it is energized and they, in turn, energize a step by step relay 55, which moves a rotary switch 56 a step at a time. A latch or pawl 57 holds the switch in its advanced position. The first several actuations of step relay 55 following, say three successive flashovers, occur without any further action being taken to reduce or cut-off the precipitator voltage. However, if a fourth flashover occurs within a predetermined time the switch arm 56 energizes a relay 60 through contact 61 and wire 62 which operate switches 64, 65 to effect a predetermined reduction in the charging voltage applied to the precipitator electrodes by introducing a resistance 64A into the line from source 29 to rectifier 24 thereby reducing the excitation of the reactors 16 to 18 through power circuit 29. If the fourth flashover is followed by a fifth and a sixth the relays 70 and 71 are energized in succession and the related switches 73, 74 and 75, 76 act to introduce additional resistances 73A and 75A into the rectifier circuit to effect further steps of the reduction of voltage applied to the precipitator electrodes. The switches 64, 65; 73, 74; and 75, 76 that are associated with relays 60, 70, 71 respectively, are so arranged in circuits leading through the resistances 64A, 73A and 75A that the latter are introduced successively into the circuit supplying rectifier 24 as the relays 60, 70 and 71 are energized in turn. The number of flashovers that may occur is related to the period of operation of the precipitator 19 between cleaning cycles as described in U.S. patent application No. 224,356, filed May 3, 1951, now Patent 2,672,947, dated March 23, 1954. As is diagrammatically illustrated in the upper right hand part of Figure 1 a rotary switch cam 80 is driven in synchronism with the cleaning device of the precipitator so that during each cleaning operation of the specific precipitator section associated with the described power supply a related switch 82 is closed. This results in energization of the latch releasing relay 85 so that latch 57 is released once during each such cleaning cycle of the precipitator section. With this control arrangement a preset number of flashovers may occur in each cycle of the charging voltage. However, any more flashovers in a single cycle would result in step by step reductions in the charging voltage so as to correct any excessive voltage conditions that might have given rise to too many flashovers. The switch 82 associated with the section of the precipitator 19 assures that the voltage reduction switch 56 is reset at the end of each operational cycle whether one or a greater number of flashovers had occurred.

What I claim is:

1. In an electrostatic precipitator power circuit having means operative to vary the voltage supplied to the precipitator electrodes; control means responsive to a predetermined increase of current in said power circuit; control means responsive to a predetermined reduction of the charging voltage applied to the precipitator electrodes due to the occurrence of a flashover; means actuated by the conjoint action of both said control means responding to a simultaneous predetermined increase of current and said means responding to a predetermined reduction of electrode voltage for operating said voltage varying means to predeterminedly reduce to a lower level the voltage applied to said electrodes so as to extinguish a flashover; and cyclic means operative when reduction of voltage by said current varying means has been effected to render said control means ineffective to maintain the electrode charging voltage at said lower level.

2. In an electrostatic prepicitator having saturable reactors connected in series with the primary winding of the transformer that supplies power to charge the precipitator electrodes; a circuit including normally closed contacts controlling the supply of current to the exciting windings of said reactors; other saturable reactors connected in parallel with said primary windings; a circuit including normally open contacts controlling the supply of current to the exciting windings of said last reactors; relay means for opening the first and closing the second mentioned contacts; a control circuit connected with said power circuit; means in said control circuit responsive to a predetermined increase of current in said electrode charging circuit; and means responsive to a simultaneous predetermined reduction of the electrode charging voltage acting conjointly with said current responsive means to energize said operating relay means.

3. In an electrostatic precipitator having means operable to lower the voltage supplied to the precipitator electrodes to a set operating voltage; a control circuit including first relay means operative to actuate said power reducing means; normally open switch contacts in said control circuit; a second relay responsive to a predetermined increase of current in said power circuit for closing said contacts; a gas filled triode, including a grid, in said control circuit in series with said second relay and contacts; a connection to said electrode charging power circuit for maintaining a bias on the grid of said triode while the voltage in said power circuit remains above a predetermined value; and means responsive to simultaneous closing of said contacts on reduction of current in said power circuit and firing of said triode upon predetermined reduction of said voltage in said power circuit acting to energize said first mentioned relay.

4. In an electrostatic precipitator power circuit having means operative to vary the voltage supplied to the precipitator electrodes; control means responsive to a predetermined increase of current in said power circuit; control means responsive to a predetermined reduction of the charging voltage applied to the precipitator electrodes due to the occurrence of a flashover; means actuated by the conjoint action of both said control means responding to a simultaneous predetermined increase of current and said means responding to a predetermined reduction of electrode voltage for operating said voltage varying means to predeterminedly reduce to a lower level the voltage applied to said electrodes so as to extinguish a flashover; means acting upon reduction of voltage by said current varying means to render said control means ineffective to maintain the electrode charging voltage at said lower level; a control relay; means for energizing said other relay in unison with the conjoint operation of said control means; mechanical means for counting the number of its energizations operated by said control relay; and relay means operative after a determined number of energizations of said control relay for progressively reducing the charging voltage applied to said electrodes in predetermined steps.

5. In an electrostatic precipitator power circuit having means operative to vary the voltage supplied to the precipitator electrodes; control means responsive to a predetermined increase of current in said power circuit; control means responsive to a predetermined reduction of the charging voltage applied to the precipitator electrodes due to the occurrence of a flashover; means actuated by the conjoint action of both said control means responding to a simultaneous predetermined increase of current and said means responding to a predetermined reduction of electrode voltage for operating said voltage varying means to predeterminedly reduce to a lower level the voltage applied to said electrodes so as to extinguish a flashover; means acting upon reduction of voltage by said current varying means to render said control means ineffective to maintain the electrode charging voltage at said lower level; a control relay; means for energizing said relay in unison with the conjoint operation of said control means; mechanical means for counting the number of its energizations operated by said control relay; relay means operative after a determined number of energizations of said control relay for progressively reducing the charging voltage applied to said electrodes in predetermined steps; and cyclic means associated with said precipitator for resetting said counting means at the end of each precipitator cycle.

6. Device for protecting an electrical supply circuit against sustained overloads, comprising a load-current-sensitive relay, a load-voltage-sensitive relay, a first saturable reactor, a main winding for said reactor connected in series with said supply circuit, a second saturable reactor, a main winding for said second reactor connected in parallel to said supply circuit, a first auxiliary winding for said first reactor, a second auxiliary winding for said second reactor, an auxiliary current source, switch means normally operated to connect said auxiliary current source to said first auxiliary winding and to disconnect it from said second auxiliary winding, and means responsive to the operation of said load-voltage-sensitive and load-current-sensitive relays for actuating said switch means to disconnect said auxiliary current source from said first auxiliary winding and connect it to said second auxiliary winding.

7. Device for protecting an electrical supply circuit against sustained overloads according to claim 6 in which said load-voltage-sensitive relay comprises a gas discharge tube connected and arranged to be triggered when the load voltage drops below a predetermined value.

References Cited in the file of this patent

UNITED STATES PATENTS

| | | |
|---|---|---|
| 1,976,569 | Levy | Oct. 9, 1934 |
| 2,050,367 | Myhre | Aug. 11, 1936 |
| 2,297,740 | Brown | Oct. 6, 1942 |
| 2,297,841 | MacKenzie | Oct. 6, 1942 |
| 2,632,522 | Fields | Mar. 24, 1953 |

FOREIGN PATENTS

| | | |
|---|---|---|
| 371,859 | Great Britain | Apr. 22, 1932 |